2,993,035
POLYMERIZATION OF ETHYLENE
Donald L. Christman, Wilmington, Del., assignor to Hercules Powder Company, Wilmington, Del., a corporation of Delaware
No Drawing. Filed Oct. 24, 1956, Ser. No. 617,930
20 Claims. (Cl. 260—94.3)

This invention relates to the polymerization of olefins under relatively mild conditions of pressure and temperature, and more particularly to a new catalyst for the polymerization of olefins and the process of polymerizing olefins with this catalyst.

In accordance with this invention, it has been found that olefins may be polymerized under relatively mild conditions of pressure and temperature by contacting the olefin with a catalyst formed by mixing a compound of a metal selected from the group consisting of the metals of group I–B of the periodic table with an aluminum compound selected from the group consisting of organometallic compounds of aluminum and aluminum hydride. It was most surprising to discover that ethylene and other olefins could be polymerized by means of an organometallic compound or hydride of aluminium in combination with a group I–B metal compound, and even more surprising were the superior results that were obtained by the use of this catalyst combination. Polymers of very high molecular weights may be obtained and the polymerization rate is outstanding when these catalyst combinations are used.

Any ethylenically unsaturated hydrocarbon or mixtures thereof may be polymerized by the process of this invention, especially hydrocarbons containing vinylidene or vinyl groups. The invention is of particular importance for the polymerization of monoethylenically unsaturated hydrocarbons wherein the unsaturated group is a vinylidene group, which compounds have the general formula

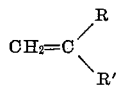

where R is alkyl and R′ is alkyl, cycloalkyl, aralkyl, aryl, alkaryl and is even more important for those wherein the vinylidene group is a vinyl group, which compounds have the general formual $CH_2=CHR$ where R is hydrogen, a linear alkyl, a branched chain alkyl, cycloalkyl, aryl, aralkyl, or alkaryl, and for the polymerization of polyethylenically unsaturated hydrocarbons such as conjugated diolefins. Exemplary of the ethylenically unsaturated hydrocarbons which may be polymerized are the linear 1-olefins such as ethylene, proylene, butene-1, hexene-1, heptene-1, octene-1, octadecene-1, dodecene-1, etc., and branched chain 1-olefins and other olefins such as isobutylene, cis-butene, diisobutylene, tert-butylethylene, 4- and 5-methylheptenes-1, tetramethylethylene, and substituted derivatives thereof such as styrene, α-methylstyrene, vinylcyclohexane, diolefins such as hexadiene-1,4, 6-methylheptadiene-1,5 and conjugated diolefins such as butadiene, isoprene, pentadiene-1,3, cyclic olefins such as cyclopentadiene, cyclohexene, 4-vinylcyclohexene-1, β-pinene, etc.

As pointed out above, the invention is of most importance for the polymerization of linear 1-olefins and, in particular, ethylene. Many of the 1-olefin polymers may be produced in crystalline form. In the polymerization of gaseous ethylene, in accordance with this invention, not only is the prdouct highly crystalline, but very high molecular weight polymers may be produced which are at the same time highly linear, the methyl content of the polymer being much lower than that normally produced, and the polymer is essentially free from unsaturation. Another advantage of the process of this invention, particularly when applied to ethylene, is the extremely high rate of polymerization that may be attained.

The polymerization of the ethylenically unsaturated hydrocarbon may be carried out in a wide variety of ways. The process may be carried out as either a batch or continuous operation and with or without the use of an inert organic diluent as the reaction medium. With the more volatile monomers, a diluent is usually preferred. Any inert liquid organic solvent may be used, as for example, aliphatic hydrocarbons such as hexane, heptane, etc., cycloaliphtatic hydrocarbons such as cyclohexane, aromatic hydrocarbons such as benzene, toluene, xylene, etc., or any mixture of such hydrocarbons, halogenated aliphatic hydrocarbons such as methylene chloride, chloroform, carbon tetrachloride, ethylene dichloride, etc., halogenated aromatic hydrocarbons such as chlorobenzenes, chloronaphthalenes, etc.

The selection of the temperature and pressure used for the polymerization process will obviously depend upon the monomer, the activity of the catalyst system being used, the degree of polymerization desired, etc. In general, the polymerization will be carried out at room temperature or slightly above, but any temperature within the range of from about —50° C. to about 150° C., preferably from about —20° C. to about 120° C. and more preferably from about 20° C. to about 100° C. may be used. In the same way, while atmospheric pressure or a pressure of only a few pounds may be used, the polymerization may be carried out over a wide range of pressures, but higher pressures do not appreciably alter the course of the polymerization and, hence, are not required.

The polymerization of the olefin in accordance with this invention may be carried out by forming the catalyst in situ, i.e., adding first one catalyst component followed by the other, or adding the two catalyst components simultaneously to the olefin that is to be polymerized, or a preformed catalyst may be used by mixing the group I–B metal compound with the aluminum compound, usually in an inert organic diluent, and then adding the olefin to the preformed catalyst. In the preparation of the preformed catalyst, an insoluble catalyst component generally is formed, which insoluble component may be separated by filtration, centrifugation, etc., and used as such in the process, or it may be separated and then washed with fresh diluent and then used. In using such preformed catalysts or catalyst components, it may be desirable in some instances to add an additional aluminum compound which may be the same one used in the preparation of the preformed catalyst or a different one. Obviously, many other variations in the process may be made, for example, either one or both components of the catalyst may be added in increments during the polymerization.

As already pointed out, any compound of a group I–B metal may be used as one of the components of the catalyst in accordance with this invention, that is, any compound of copper, silver or gold. The compound may be an inorganic salt such as a halide, sulfate, carbonate, etc., an oxide, or an organic salt or complex such as an acetylacetonate, etc. Exemplary of the group I–B metal compounds that may be used are cupric chloride, cuprous chloride, cupric bromide, cuprous bromide, cupric sulfate, basic cupric carbonate, cuprous oxide, cupric acetylacetonate, silver chloride, silver acetylacetonate, aurous chloride, auric chloride, etc. Of particular value are the halides of the group I–B metal. It is usually desirable to use the group I–B metal compound in the form of a solution in a diluent, as for example, of the type used in the polymerization of the olefin or to use them in a finely divided form such as obtained by grinding by any desired means, as for example, in a pebble mill, ball mill, etc. It is particularly desirable to use the group I–B metal compound in very finely divided form, if the diluent being used is one in which the group I–B metal compound is not at least partially soluble.

The aluminum compound that is reacted with the group I–B metal compound may be any organo compound of aluminum or aluminum hydride or a complex thereof. Exemplary of the aluminum compounds that may be used are trimethylaluminum, triethylaluminum, tripropylaluminum, triisobutylaluminum, tiroctylaluminum, tridodecylaluminum, dimethylalumnium chloride, diethylaluminum bromide, diethylaluminum chloride, ethylaluminum dichloride the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organoaluminum compounds, as for example, sodium aluminum tetraethyl, lithium aluminum tetraoctyl, etc., aluminum hydride, and complexes of aluminum hydride such as lithium aluminum hydride. As in the case of the group I–B metal compound, if the aluminum compound is not at least partially soluble in the diluent used for the polymerization process, it may be desirable to ball-mill or otherwise finely divide the aluminum compound prior to its use in the process.

When the group I–B metal compound and the aluminum compound are mixed in the preparation of the catalyst, a reaction takes place, the nature of which is not completely understood. Nevertheless, the catalyst so produced is extremely effective for the polymerization of gaseous ethylene and other ethylenically unsaturated hydrocarbons. The molar ratio of the group I–B metal compound to the aluminum compound may be varied over a wide range and will depend on the type of aluminum compound that is mixed with the particular group I–B metal compound. In general, the molar ratio of the organometallic compound to the group I–B metal compound will be from about 0.1:1 to 100:1 and more usually will be from about 0.3:1 to 10:1.

As will be obvious from the following examples, many variations may be made in the process of this invention. For example, in many instances, it may be desirable to add a viscosity-reducing agent such as hydrogen, etc., to reduce the viscosity of the polymer that is obtained. In some cases, oxygen may function as an activator or other desirable function and may be added.

The following examples will demonstrate the process of polymerizing olefins in accordance with this invention and some of the many modifications that can be made in this process. The molecular weight of the polymers produced in these examples is indicated by the Reduced Specific Viscosity (RSV) given for each. By the term "Reduced Specific Viscosity" is meant the $\eta sp./C$. determined on an 0.1% solution of the polymer in decalin, containing 0.1 g. of the polymer per 100 ml. of solution (unless otherwise indicated), at 135° C. Where the melting point of the polymer is given, it is the temperature at which the birefringence due to crystallinity disappears. All parts and percentages are by weight unless otherwise indicated.

EXAMPLES 1–30

In each of these examples a polymerization vessel, freed from air, was charged with a diluent and about 1.8 parts of gaseous ethylene. The initial pressure in each case was about 50 p.s.i.g. except in the case of Example 22 which was run at −20° C. and had an initial pressure of 26 p.s.i.g. A group I–B metal compound was then added and after equilibrating at 30° C. (except for Example 22 wherein the polymerization was carried out at −20° C.), the aluminum compound (either dissolved or suspended in n-heptane) was added. The copper and gold compounds used in Examples 1–21 and 25–30, respectively, were ball-milled in n-heptane and the resulting suspensions were used. The silver chloride used in Examples 22 and 23 was also ball-milled in n-heptane but after the ball-milling, was collected and dried and added as the dry powder. In Example 24 the silver chloride was merely ground to pass a 100-mesh screen and added as such. In Example 13, the aluminum compound, lithium aluminum hydride, was also ball-milled. The group I–B metal compound and amount thereof, the aluminum compound and amount thereof, the diluent and the reaction time for each polymerization are set forth in Table I. After the indicated number of hours at 30° C. (except for Example 22 which was run at −20° C.), the polymerization was stopped by adding alcohol, either ethanol (4 parts) or n-butanol (1.6 parts).

*Isolation of the polymers.*—In Example 1 the low boiling portion of the diluent was removed and the remainder of the polymerization reaction mixture was extracted with boiling xylene whereupon a portion of the polymer dissolved and then reprecipitated when the xylene extract was cooled. Both the boiling xylene-soluble polymer and the insoluble polymer were triturated, first with methanol and then with concentrated ammonium hydroxide, after which they were each washed with water, then with methanol and dried. The fraction soluble in boiling xylene had an RSV of 17 and a melting point of 134° C. The fraction insoluble in boiling xylene had a melting point of 136° C. and an RSV >60.

In Example 3 the reaction mixture was filtered to isolate the insoluble polymer which was then washed with a 10% solution of hydrogen chloride in methanol, then with concentrated ammonium hydroxide, water, and finally methanol and then dried. This carbon tetrachloride insoluble polymer had an RSV of 15.9 and melting point of 131° C. The filtrate remaining after separation of the insoluble polymer was washed with 10% hydrogen chloride in methanol and the carbon tetrachloride was removed. The polyethylene so obtained was of low molecular weight and waxlike in nature.

In each of the other examples the reaction mixture was filtered to isolate the insoluble polymer. In Examples 2, 4 and 5 the polymer was treated as described for the insoluble polymer of Example 3. In Examples 6–21 and 25–30 the isolated polymer was washed twice with n-heptane, twice with anhydrous ethanol, and then refluxed for 15 minutes with a 10:10:2 mixture of toluene:butanol:concentrated hydrochloric acid. After filtering off the polymer, it was washed with methanol until neutral and dried. In Examples 22–24 the polymer was refluxed with 10% methanolic hydrogen chloride, washed with methanol until neutral, treated with a 2:1 mixture of concentrated nitric acid and water, washed with water, treated with a concentrated ammonium hydroxide solution containing ammonium chloride, and finally was washed with water until neutral, then with methanol and dried. The RSV's of the polyethylenes so obtained are set forth in Table I, as is also the melting point on a number of the polymers.

Table I

| Example | Group I-B Metal Compound | Parts | Aluminum Compound | Parts | Diluent | Reaction Time, Hrs. at 30° C. | RSV | Melting Point, °C. |
|---|---|---|---|---|---|---|---|---|
| 1 | CuCl$_2$ | 0.13 | Al(C$_2$H$_5$)$_3$ | 0.23 | CH$_2$Cl$_2$ | 18 | 17 | 134 |
| 2 | CuCl$_2$ | 0.13 | Al(C$_2$H$_5$)$_3$ | 0.23 | n-Heptane | 18 | >60 | 134 |
| 3 | CuCl$_2$ | 0.13 | Al(C$_2$H$_5$)$_3$ | 0.23 | CCl$_4$ | 18 | 15.9 | 131 |
| 4 | CuCl$_2$ | 0.13 | Al(C$_2$H$_5$)$_2$Cl | 0.24 | CH$_2$Cl$_2$ | 18 | 27 | 137 |
| 5 | CuBr$_2$ | 0.22 | Al(C$_2$H$_5$)$_3$ | 0.23 | CH$_2$Cl$_2$ | 3.5 | 8.2 | 130 |
| 6 | CuBr$_2$ | 0.11 | Al(C$_2$H$_5$)$_2$Cl | 0.18 | n-Heptane | 18 | 20.2 | 134 |
| 7 | CuBr$_2$ | 0.11 | Al(C$_2$H$_5$)$_2$Cl | 0.18 | CH$_2$Cl$_2$ | 20 | 8.0 | 132 |
| 8 | CuBr$_2$ | 0.11 | Al(C$_2$H$_5$)Cl$_2$ | 0.18 | n-Heptane | 1.6 | 20.3 | 133 |
| 9 | CuBr$_2$ | 0.11 | Al(i-C$_4$H$_9$)$_2$H | 0.14 | ___do___ | 18 | >60 | |
| 10 | CuBr$_2$ | 0.11 | AlH$_3$ | 0.06 | ___do___ | 18 | 17.2 | |
| 11 | CuBr$_2$ | 0.11 | Al(CH$_3$)$_2$ | 0.07 | ___do___ | 18 | 19 | |
| 12 | CuBr$_2$ | 0.11 | Al(octyl)$_3$ | 0.37 | ___do___ | 18 | 19 | |
| 13 | CuBr$_2$ | 0.11 | LiAlH$_4$ | 0.08 | ___do___ | 19 | 44 | |
| 14 | CuA$_2$ | 0.13 | Al(C$_2$H$_5$)$_3$ | 0.17 | ___do___ | 18 | | 134 |
| 15 | Cu$_2$Cl$_2$ | 0.10 | Al(C$_2$H$_5$)$_3$ | 0.11 | ___do___ | 18 | >5.4 | |
| 16 | Cu$_2$Cl$_2$ | 0.10 | Al(C$_2$H$_5$)$_2$Cl | 0.18 | ___do___ | 18 | 9.6 (at 0.025% conc.) | |
| 17 | Cu$_2$Cl$_2$ | 0.10 | Al(C$_2$H$_5$)Cl$_2$ | 0.18 | ___do___ | 18 | | 135 |
| 18 | Cu$_2$O | 0.14 | Al(C$_2$H$_5$)$_3$ | 0.23 | ___do___ | 19 | >21 (at 0.02% conc.) | |
| 19 | CuSO$_4$ | 0.16 | Al(C$_2$H$_5$)$_3$ | 0.23 | ___do___ | 19 | >60 | |
| 20 | CuSO$_4$ | 0.16 | Al(C$_2$H$_5$)$_2$Cl | 0.36 | ___do___ | 19 | >16.2 | |
| 21 | CuSO$_4$ | 0.16 | Al(C$_2$H$_5$)Cl$_2$ | 0.37 | ___do___ | 19 | >3.7 | |
| 22 | AgCl | 0.29 | Al(C$_2$H$_5$)$_3$ | 0.23 | ___do___ | 70 (at −20° C.) | 25 (0.03% conc.) | 135 |
| 23 | AgCl | 0.29 | Al(C$_2$H$_5$)$_3$ | 0.23 | ___do___ | 18 | 25 (at 0.05% conc.) | |
| 24 | AgCl | 1.14 | Al(C$_2$H$_5$)$_3$ | 0.23 | ___do___ | 18 | >0.4 | 132 |
| 25 | AuCl$_3$ | 0.24 | Al(C$_2$H$_5$)$_3$ | 0.23 | ___do___ | 19 | >1.2 | |
| 26 | AuCl$_3$ | 0.24 | Al(C$_2$H$_5$)$_2$Cl | 0.36 | ___do___ | 2.5 | >1.6 | |
| 27 | AuCl$_3$ | 0.24 | Al(C$_2$H$_5$)Cl$_2$ | 0.37 | ___do___ | 19 | >6.5 | |
| 28 | AuCl | 0.23 | Al(C$_2$H$_5$)$_3$ | 0.23 | ___do___ | 19 | >16.3 | 133 |
| 29 | AuCl | 0.23 | Al(C$_2$H$_5$)$_2$Cl | 0.36 | ___do___ | 19 | >5.6 | |
| 30 | AuCl | 0.23 | Al(C$_2$H$_5$)Cl$_2$ | 0.37 | ___do___ | 1.0 | >0.3 | |

EXAMPLES 31–34

Each of a series of polymerization vessels was charged with 30 parts of n-heptane and about 1.8 parts of gaseous ethylene (initial pressure of about 50 p.s.i.g.). After equilibrating at 30° C., there was added to each of the vessels in Examples 31 and 32 2.8 parts of a preformed catalyst mixture which was prepared by mixing 0.28 part of ball-milled cupric bromide and 0.31 part of ethylaluminum dichloride in 6.8 parts of n-heptane and allowing the mixture to stand at 30° C. for about 1 hour. In Examples 33 and 34 the insoluble portion of the preformed catalyst mixture prepared as described for Examples 31 and 32 was separated, washed twice with n-heptane and then was resuspended in n-heptane and added to the polymerization vessel. To each of the vessels in Examples 32 to 34 was also added an alkylaluminum compound. After 18 hours at 30° C., the polymerization was stopped by adding 4 parts of anhydrous ethanol. The insoluble polyethylene produced in each case was separated from the reaction mixture by filtration and purified in the same manner as described for Examples 6 to 21 above. The alkylaluminum compound and the amount thereof added in each example is set forth in Table II below along with the RSV of the insoluble polyethylenes so produced and the percent conversion to said polymer.

Table II

| Example | Aluminum Compound Added | Parts | Insoluble Polymer Isolated | | |
|---|---|---|---|---|---|
| | | | RSV | Percent Conversion | Melting Point, °C. |
| 31 | | | 14.4 | 35 | 132 |
| 32 | Al(C$_2$H$_5$)$_3$ | 0.11 | 35.4 | 72 | |
| 33 | Al(C$_2$H$_5$)$_3$ | 0.11 | 115 | 73 | |
| 34 | Al(C$_2$H$_5$)$_2$Cl | 0.12 | 37.5 | 64 | |

EXAMPLE 35

Each of two polymerization vessels was charged with 33 parts of heptane, 1.4 parts of gaseous ethylene, and 0.11 part triethylaluminum in 0.7 part n-heptane. To one was also added 15 mole percent (17 p.s.i.a.) of hydrogen (based on ethylene+hydrogen). After equilibrating at 30° C., 0.07 part of cupric chloride ball-milled in 0.9 part of n-heptane was then added to each. After 42 hours at 30° C., the polymerization was stopped and the polyethylene was isolated and purified as above. In the polymerization carried out without hydrogen, the polymer had an RSV of >60 whereas that produced in the presence of hydrogen had an RSV of 3.4 and a melting point of 136° C. Infrared analysis of the latter polymer indicated the presence of only 0.03% methyl groups and no double bond groups (vinyl, vinylidene, or trans-vinylene) were detected. Thus, the polymer produced in the presence of hydrogen was a highly linear polyethylene.

EXAMPLES 36–40

In these examples different monomers or mixtures of monomers were polymerized by the process of the invention. Each polymerization vessel, free from air, was charged with the diluent (30 parts of n-heptane except in Example 38 where 40 parts of toluene was used), the monomer or monomers, a solution of triethylaluminum in n-heptane and a suspension of ball-milled cupric bromide in n-heptane. The monomer or monomers, amount thereof, and the amount of each of the catalyst components is set forth in Table III below. After the indicated number of hours at 30° C., the polymerization was stopped in each case by adding 4 parts of ethanol.

The heptane-insoluble polymers produced in Examples 36, 37, 39 and 40 were isolated and purified as described in Examples 6 to 21. A heptane-soluble polymer was also isolated in Examples 36, 37, and 39 by concentration of the filtrate and heptane wash remaining after separation of the insoluble polymer and removing the diluent (Example 36) or precipitating the heptane-soluble polymer with ethanol (Examples 37 and 39). In Example 38 the polymer was isolated and purified by twice washing the total reaction mixture with a 10% solution of hydrogen chloride in methanol, twice with methanol, twice with concentrated ammonium hydroxide, and then with water until neutral, and after removing a portion of the toluene, precipitating the polymer by addition of a large excess of ethanol. A solution of this polystyrene when cast on aluminum produced a very strongly adherent film. A description of the physical properties of each of the polymers obtained in these examples is given in Table III.

The periodic table referred to in the specification is that given in the Handbook of Chemistry and Physics, pages 329 and 393 of the 36th edition. According to this table the group I–B metals consist of copper, silver and gold.

Table III

| Example | Monomer(s) | Parts | $CuBr_2$, Parts | $Al(C_2H_5)_3$, Parts | Reaction Time, Hrs. | Isolated Polymer | |
|---|---|---|---|---|---|---|---|
| | | | | | | Heptane-Insoluble | Heptane-Soluble |
| 36 | Propylene | 7.9 | 0.11 | 0.11 | 42 | Highly crystalline typical X-Ray pattern. Melting point 152° C. RSV of 0.3. | Small amount of soft waxy solid. |
| 37 | {Ethylene, Propylene} | {1.7, 1.7} | {0.11, 0.11} | {0.11, 0.11} | 1.7 | Melting point 126° C. RSV of 9.7. Contained 25% propylene (Infrared). | RSV of 1.1. Soft and rubbery. |
| 38 | Styrene | 10 | 0.22 | 0.23 | 18 | Ethanol-insoluble polymer. | |
| 39 | Butadiene | 12 | 0.22 | 0.23 | 18 | An extensible, rubber-like solid. | A film-forming solid. |
| 40 | {Ethylene, Butadiene} | {1.9, 1.8} | 0.06 | 0.11 | 18 | RSV of 20.8. | |

What I claim and desire to protect by Letters Patent is:

1. The process of polymerizing ethylenically unsaturated hydrocarbons which comprises contacting at least one ethylenically unsaturated hydrocarbon containing from 2 to 8 carbon atoms per molecule with a catalyst formed by mixing, in a molar ratio of from about 1:0.3 to about 1:10 and as the sole components of the catalyst, a compound of a group I–B metal of the periodic table with an aluminum compound selected from the group consisting of alkylaluminum compounds, aluminum hydride and alkali metal aluminum hydrides.

2. The process of claim 1 wherein the ethylenically unsaturated hydrocarbon is a monoethylenically unsaturated hydrocarbon.

3. The process of claim 1 wherein the ethylenically unsaturated hydrocarbon is a conjugated diolefin.

4. The process of copolymerizing ethylenically unsaturated hydrocarbons which comprises contacting a mixture containing at least two ethylenically unsaturated hydrocarbons, each of said hydrocarbons containing from 2 to 8 carbon atoms per molecule, with a catalyst formed by mixing, in a molar ratio of from about 1:0.3 to about 1:10 and as the sole components of the catalyst, a compound of a group I–B metal of the periodic table with an aluminum compound selected from the group consisting of alkylaluminum compounds, aluminum hydride and alkali metal aluminum hydrides.

5. The process of claim 2 wherein the monoethylenically unsaturated hydrocarbon is a 1-olefin.

6. The process of claim 5 wherein the 1-olefin is a linear 1-olefin.

7. The process of claim 6 wherein the group I–B metal compound is a copper compound.

8. The process of claim 6 wherein the group I–B metal compound is a silver compound.

9. The process for the polymerization of a linear 1-olefin having from 2 to 8 carbon atoms per molecule which comprises contacting the said olefin with a catalyst formed by mixing as the sole components of the catalyst a copper salt with an alkylaluminum compound in a molar ratio of from about 1:0.3 to about 1:10.

10. The process for the polymerization of a linear 1-olefin having from 2 to 8 carbon atoms per molecule which comprises contacting the said olefin with a catalyst formed by mixing as the sole components of the catalyst a silver salt with an alkylaluminum compound in a molar ratio of from about 1:0.3 to about 1:10.

11. The process of claim 9 wherein the linear 1-olefin is ethylene.

12. The process of claim 10 wherein the linear 1-olefin is ethylene.

13. The process of claim 11 wherein the copper salt is cupric bromide.

14. The process of claim 12 wherein the silver salt is silver chloride.

15. The process of polymerizing ethylene which comprises contacting ethylene with a catalyst formed by mixing as the sole components of the catalyst cupric bromide with a trialkylaluminum in a molar ratio of from about 1:0.3 to about 1:10.

16. The process of polymerizing ethylene which comprises contacting ethylene with a catalyst formed by mixing as the sole components of the catalyst cupric bromide with a dialkylaluminum halide in a molar ratio of from about 1:0.3 to about 1:10.

17. The process of polymerizing ethylene which comprises contacting ethylene with a catalyst formed by mixing as the sole components of the catalyst cupric bromide with an alkylaluminum dihalide in a molar ratio of from about 1:0.3 to about 1:10.

18. A polymerization catalyst comprising the product formed by reacting, in a molar ratio of from about 1:0.3 to about 1:10 and as the sole components of the catalyst, a compound of the group I–B metal of the periodic table with an aluminum compound selected from the group consisting of alkylaluminum compounds, aluminum hydride and alkali metal aluminum hydrides.

19. A polymerization catalyst comprising the product formed by reacting as the sole components of the catalyst a copper compound with an alkylaluminum compound in a molar ratio of from about 1:0.3 to about 1:0.

20. A polymerization catalyst comprising the product formed by reacting as the sole components of the catalyst a silver compound with an alkylaluminum compound in a molar ratio of from about 1:0.3 to about 1:10.

References Cited in the file of this patent

UNITED STATES PATENTS

| | | |
|---|---|---|
| 2,824,089 | Peters | Feb. 18, 1958 |
| 2,827,447 | Nowlin | Mar. 18, 1958 |
| 2,886,561 | Reynolds et al. | May 12, 1959 |
| 2,888,448 | Gresham et al. | May 26, 1959 |
| 2,905,645 | Anderson et al. | Sept. 22, 1959 |
| 2,909,511 | Thomas | Oct. 20, 1959 |

OTHER REFERENCES

Ziegler et al.: Angew. Chem. 67 (October 7, 1955), 541–547.

UNITED STATES PATENT OFFICE
CERTIFICATION OF CORRECTION

Patent No. 2,993,035            July 18, 1961

Donald L. Christman

It is hereby certified that error appears in the above numbered patent requiring correction and that the said Letters Patent should read as corrected below.

Column 8, line 53, for "1:0" read -- 1:10 --.

Signed and sealed this 10th day of April 1962.

(SEAL)
Attest:

ERNEST W. SWIDER            DAVID L. LADD
Attesting Officer            Commissioner of Patents